(12) United States Patent
Seymour

(10) Patent No.: US 6,564,558 B1
(45) Date of Patent: May 20, 2003

(54) DISPOSABLE SELF-COOLING, SELF-HEATING CONTAINER

(76) Inventor: Michael L. Seymour, 1717 E. 15th. St., Tulsa, OK (US) 74104

( * ) Notice: Subject to any disclaimer, the term of this patent is extended or adjusted under 35 U.S.C. 154(b) by 0 days.

(21) Appl. No.: 09/992,267

(22) Filed: Nov. 14, 2001

Related U.S. Application Data

(63) Continuation-in-part of application No. 09/680,173, filed on Oct. 5, 2000.

(51) Int. Cl.[7] .............................. F25D 5/00; F25D 3/08; B65B 63/08; F24J 1/00
(52) U.S. Cl. ............... 62/4; 62/60; 62/371; 126/263.09
(58) Field of Search .................. 62/4, 60, 371; 126/263.08, 263.05, 263.06, 263.07

(56) References Cited

U.S. PATENT DOCUMENTS

| | | | |
|---|---|---|---|
| 2,300,793 A | | 11/1942 | Martin |
| 2,622,415 A | | 12/1952 | Landers et al. |
| 2,968,932 A | | 1/1961 | Vance et al. |
| 3,149,943 A | * | 9/1964 | Amador ................. 126/263.09 |
| 3,494,143 A | * | 2/1970 | Barnett et al. .............. 126/262 |
| 3,653,372 A | * | 4/1972 | Douglas ..................... 126/262 |
| 3,726,106 A | * | 4/1973 | Jaeger ........................ 126/262 |
| 3,865,117 A | * | 2/1975 | Perry, III ............... 126/263.07 |
| 3,957,472 A | * | 5/1976 | Donnelly ......................... 62/4 |
| 4,462,224 A | * | 7/1984 | Dunshee et al. ............ 206/219 |
| 4,753,085 A | | 6/1988 | Labrousse |
| 4,773,389 A | * | 9/1988 | Hamasaki ................... 126/262 |
| 6,209,344 B1 | * | 4/2001 | Mahajan ...................... 62/371 |
| 6,233,945 B1 | * | 5/2001 | Kohout ........................... 62/4 |

FOREIGN PATENT DOCUMENTS

| | | |
|---|---|---|
| DE | 2221056 | 4/1972 |
| DE | 3501733 A1 | 7/1986 |
| JO | 1155173 | 12/1987 |

* cited by examiner

*Primary Examiner*—William C. Doerrler
(74) *Attorney, Agent, or Firm*—Capehart Law Firm; Brent A. Capehart

(57) ABSTRACT

A disposable container which has the ability to independently cool or heat a liquid beverage or food product by way of an endothermic or exothermic reaction. The container is disposable and has a double-walled configuration to create a chamber therebetween. Within the chamber is a chemical compound which when activated provides the desired reaction upon the contents within the container. Thus, there is no requirement that this device must be subjected to external refrigeration or heat.

6 Claims, 1 Drawing Sheet

DISPOSABLE SELF-COOLING, SELF-HEATING CONTAINER

REFERENCE TO PENDING APPLICATIONS

This application is a Continuation-In-Part of U.S. patent application Ser. No. 09/680,173 filed Oct. 5, 2000.

REFERENCE TO MICROFICHE APPENDIX

This application is not referenced in any microfiche appendix.

BACKGROUND OF THE INVENTION

1. Field of the Invention

The present invention is generally directed toward a container, specifically toward a disposable self-cooling, self-heating container.

2. Background

Containers designed to cool liquid beverage have been known heretofore, however, such containers have been constructed of material which prohibits disposability of such containers. For example, U.S. Pat. No. 2,622,415 issued to Landers et al. on Dec. 23, 1952 discloses a device for chilling foodstuffs. The device is made from glass or other molded cast materials.

The prior art cooling containers also demonstrate another disadvantage in that materials utilized for cooling the beverage do not produce the cooling effect independently. The prior art devices are typically designed for multiple use and therefore utilize gels and chemical compounds which can be heated and cooled repeatedly. The cooling process of the gel or chemical compound is effectuated by placing the device within a refrigerated compartment. This type of construction is limited in its applicability and is significantly costly to develop. Furthermore, there is not known a container which can produce heat independently in order to heat a beverage or food product.

There is, therefore, a need for a container constructed of a disposable material which can provide an independent cooling or heating effect upon a liquid beverage or food product. The cooling or heating effect would be provided by a material which can create its own cooling or heating sensation.

| Patent Number | Inventor | Title |
| --- | --- | --- |
| 2,622,415 | Landers et al | Chilling Foodstuffs |

BRIEF SUMMARY OF THE INVENTION

The present invention satisfies the needs discussed above. The present invention is generally directed toward a container, specifically toward a disposable self-cooling, self-heating container.

The present invention is directed toward a disposable container which has the ability to independently cool or heat a liquid beverage or a food product. The container is made from easily disposable material, such as a plastic product. The container further has a chamber which is located at the bottom portion of the container or completely encasing the container to create a double-walled configuration. Within the chamber is a cooling/heating means by which the liquid beverage or food product is cooled or heated.

The cooling/heating means is a chemical compound which, when activated, provides an endothermic or exothermic reaction causing a cooling or heating effect upon the contents within the container. Thus, there is no requirement that this device must be subjected to external refrigeration or heat.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

Figure 1:
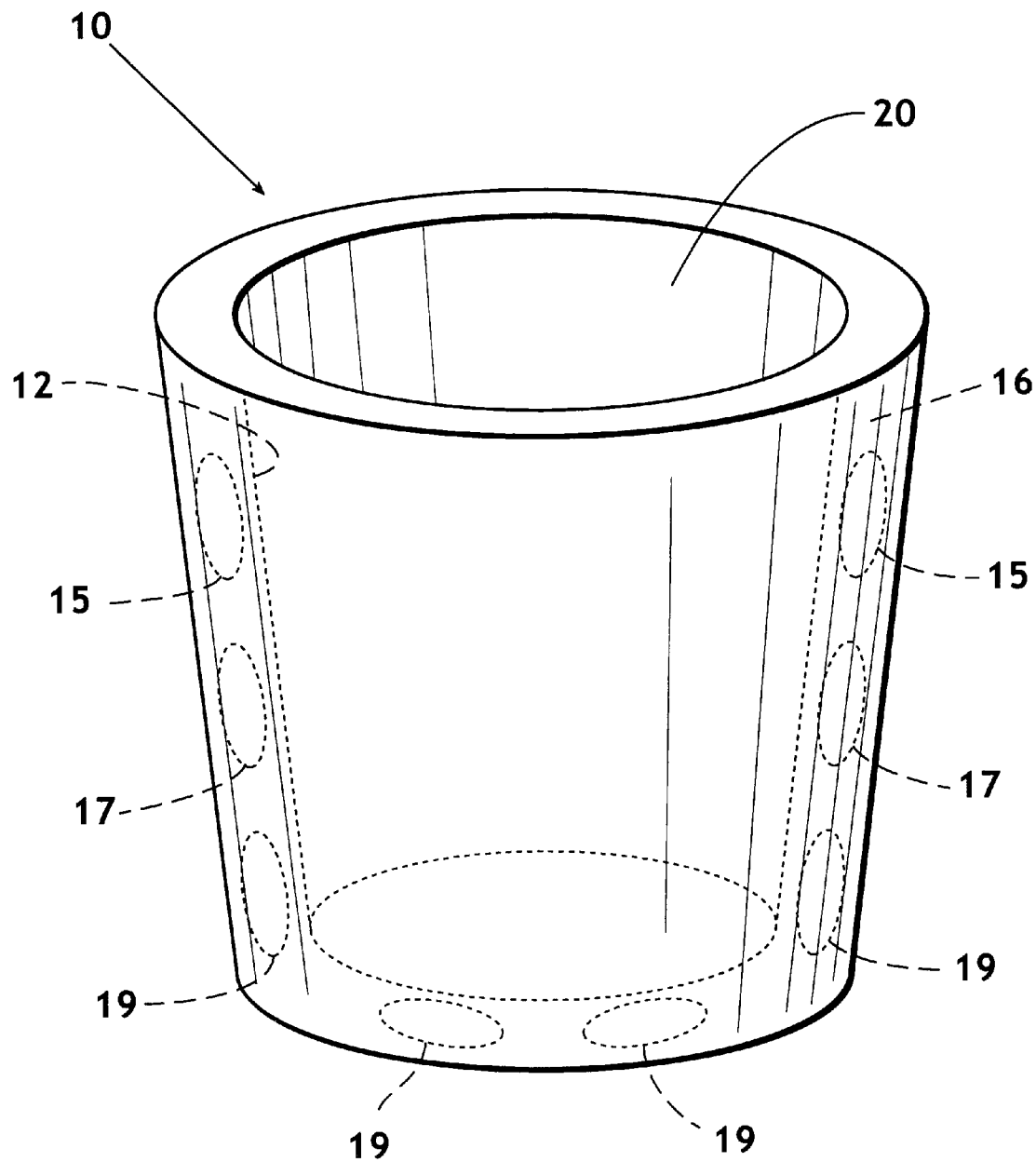
FIG. 1 is a perspective view of an embodiment of the present invention having a double-walled configuration.

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

An embodiment of the present invention is illustrated in the figures. A disposable container 10 is shown. Container 10 has an inner wall 12 and an outer wall defining a chamber 16 and a container 10. Within chamber 16, is located a chemical composition for producing an endothermic or exothermic reaction. This composition will include a plurality of chemical components contained within rupturable pouches.

Container 10 is made from a disposable material, such as a plastic product. This allows for container 10 to be utilized one time and then disposed of. While this embodiment is shown in a cup configuration, it is within the scope of the invention to include other configurations. Therefore, this embodiment is not meant to be limiting but rather is meant as an illustration.

One embodiment of the chemical composition that produces an endothermic or exothermic reaction has a first chemical located within a first chemical pouch 15, a second chemical located within a second pouch 17 and a solvent located within a solvent pouch 19. When the first chemical pouch 15, second chemical pouch 17 and solvent pouch 19 rupture, the chemicals and solvent combine to produce the endothermic reaction. When pouches 15, 17 and 19 rupture, the individual chemicals contained therein flow into chamber 16 and mixes with the other chemicals from the other pouches. This mixing produces the desired endothermic or exothermic reaction.

Known chemical components which, when combined, create an endothermic reaction include ammonium nitrate, ammonium sulfamate, ammonium nitrite, ammonium iodide, ammonium bromide, sodium chloride, sodium nitrate, sodium nitrite, sodium carbonate, sodium bicarbonate, potassium nitrate, potassium nitrite, urea, methylurea, and combinations thereof. Additionally, it is known that water can be an acceptable solvent.

An embodiment of the present invention in operation is illustrated as follows. A person activates the chemical composition contained within chamber 16 of container 10 by outer wall 14. The chemical composition contained within first chemical pouch 15, second chemical pouch 17 and solvent pouch 19 rupture, causing such chemical to combine to produce the desired reaction.

Although the above-example described the liquid beverage being placed within the container 10 after the cooling means had been activated, it is within the spirit and scope of this invention that the liquid beverage can be placed within the cup 20 prior to the activation of chemical composition.

The above embodiments in no way limit the present invention. It is anticipated that various configurations involving a container made of a disposable material containing a chamber in which a cooling means which can independently produce a cooling effect is located.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A container comprising:

a double-walled container having an inner wall and an outer wall defining a cup portion for the reception of desired contents and a fully enclosed chamber located between said inner wall and said outer wall; and a plurality of rupturable pouches located within said fully enclosed chamber, wherein each of said plurality of rupturable pouches contains a chemical component wherein when said rupturable pouches rupture the chemical components contained therein mix together and produce a chemical reaction and wherein at least one of said plurality of rupturable pouches has a first chemical component contained therein and at least one of said plurality of rupturable pouches has a second chemical component contained therein and at least one of said plurality of rupturable pouches has a solvent contained therein and wherein said first and second chemical and said solvent mutually react with each other to produce heat or cold.

2. The container of claim 1 wherein said chemical reaction is an exothermic reaction.

3. The container of claim 1 wherein said chemical components are selected from the group consisting of ammonium nitrate, ammonium sulfamate, ammonium nitrite, ammonium iodide, ammonium bromide, sodium chloride, sodium nitrate, sodium nitrite, sodium carbonate, sodium bicarbonate, potassium nitrate, potassium nitrite, urea, methylurea, water and combinations thereof.

4. The container of claim 1 wherein said first chemical and second chemical are selected from the group consisting of ammonium nitrate, ammonium sulfamate, ammonium nitrite, ammonium iodide, ammonium bromide, sodium chloride, sodium nitrate, sodium nitrite, sodium carbonate, sodium bicarbonate, potassium nitrate, potassium nitrite, urea, methylurea, and combinations thereof, said first chemical and said second chemical being different.

5. The container of claim 1 wherein said solvent is water.

6. The container of claim 1 wherein said plurality of rupturable pouches rupture due to the squeezing of the walls of said double-walled container.

* * * * *